(12) United States Patent
Tsuji et al.

(10) Patent No.: US 9,331,493 B2
(45) Date of Patent: May 3, 2016

(54) ELECTRIC LOAD CONTROL APPARATUS

(71) Applicant: HONDA MOTOR CO., LTD., Tokyo (JP)

(72) Inventors: Naotaka Tsuji, Nasushiobara (JP);
Toshiyuki Uemori, Utsunomiya (JP);
Tomiyuki Shirasawa, Utsunomiya (JP);
Takasuke Kurihara, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 648 days.

(21) Appl. No.: 13/737,646

(22) Filed: Jan. 9, 2013

(65) Prior Publication Data

US 2013/0181520 A1    Jul. 18, 2013

(30) Foreign Application Priority Data

Jan. 13, 2012   (JP) .................................. 2012-004567

(51) Int. Cl.
| | | |
|---|---|---|
| H04B 15/00 | (2006.01) | |
| H02J 4/00 | (2006.01) | |
| H02M 1/12 | (2006.01) | |

(52) U.S. Cl.
CPC ................. *H02J 4/00* (2013.01); *H02M 1/126* (2013.01); *H02M 2001/123* (2013.01); *Y10T 307/406* (2015.04)

(58) Field of Classification Search
CPC ... H02J 4/00; H02M 1/126; H02M 2001/123; Y10T 307/406
USPC ....................................................... 307/89, 91
See application file for complete search history.

(56) References Cited

U.S. PATENT DOCUMENTS

| | | | |
|---|---|---|---|
| 3,917,900 | A | 11/1975 | Arnaudin, Jr. |
| 5,099,410 | A | 3/1992 | Divan |
| 6,143,406 | A | 11/2000 | Uchida et al. |
| 7,880,576 | B2 | 2/2011 | Matsuzaki |
| 2009/0117328 | A1 | 5/2009 | Kawai et al. |
| 2009/0284199 | A1 | 11/2009 | Kitanaka |
| 2010/0214808 | A1 | 8/2010 | Rodriguez |

(Continued)

FOREIGN PATENT DOCUMENTS

| | | |
|---|---|---|
| CN | 101473519 A | 7/2009 |
| DE | 691 11 986 T2 | 11/1995 |

(Continued)

OTHER PUBLICATIONS

Office Action, Japanese Patent Application No. 2012-004567 mailing date Nov. 12, 2013.

(Continued)

*Primary Examiner* — Hal Kaplan
(74) *Attorney, Agent, or Firm* — Westerman, Hattori, Daniels & Adrian, LLP

(57) ABSTRACT

An electric load control apparatus includes an inverter connected to input terminals of an electric storage device, and having output terminals connected via output electric power lines to an electric motor. The inverter includes switching elements, which are controlled to energize the electric motor with electric power stored in the electric storage device. A noise removal filter disposed on at least a portion of the output electric power lines includes a bendable sheet made of a magnetic material wound around the output electric power lines, with air gaps disposed between coiled sheet layers of the wound sheet.

5 Claims, 18 Drawing Sheets

(56) References Cited

U.S. PATENT DOCUMENTS

| | | |
|---|---|---|
| 2012/0033463 A1 | 2/2012 | Rodriguez |
| 2012/0039099 A1 | 2/2012 | Rodriguez |
| 2012/0212302 A1 | 8/2012 | Morgenstern |

FOREIGN PATENT DOCUMENTS

| | | |
|---|---|---|
| DE | 36 85 698 T2 | 1/1996 |
| DE | 199 09 569 A1 | 9/1999 |
| DE | 20 2007 019 355 U1 | 2/2012 |
| EP | 0 214 305 A1 | 3/1987 |
| EP | 0 337 716 A2 | 10/1989 |
| EP | 0 401 805 A2 | 12/1990 |
| JP | 56/065221 A | 6/1981 |
| JP | 05-135934 A | 6/1993 |
| JP | 08-047244 A | 2/1996 |
| JP | 10-070808 A | 3/1998 |
| JP | 11/077336 A | 3/1999 |
| JP | 2000-243616 A | 9/2000 |
| JP | 2001-268890 A | 9/2001 |
| JP | 2011-077217 A | 4/2011 |
| WO | 2011/050898 A1 | 5/2011 |
| WO | WO 2011050898 A1 * | 5/2011 |

OTHER PUBLICATIONS

German Office Action, German Patent Applicaion No. 102013200273.4 issued Feb. 11, 2014.

German Search Report, German Patent Applicaion No. 102013200273.4 issued Feb. 11, 2014.

Chinese Office Action dated Nov. 3, 2014, issued in corresponding Chinese Application No. 201210580944.1; w/English Translation. ( 9 pages).

* cited by examiner (COMPARATIVE EXAMPLE)

(COMPARATIVE EXAMPLE)

(COMPARATIVE EXAMPLE)

(COMPARATIVE EXAMPLE)

(COMPARATIVE EXAMPLE)

ELECTRIC LOAD CONTROL APPARATUS

CROSS-REFERENCE TO RELATED APPLICATION

This application is based upon and claims the benefit of priority from Japanese Patent Application No. 2012-004567 filed on Jan. 13, 2012, the contents of which are incorporated herein by reference.

BACKGROUND OF THE INVENTION

1. Field of the Invention

The present invention relates to an electric load control apparatus including an electric storage device and an electric power converter, which is connected to the electric storage device through input electric power lines, and which also is connected through output electric power lines to an electric load, the electric power converter having switching elements that are controlled in order to energize the electric load with electric power stored in the electric storage device. More particularly, the present invention relates to an electric load control apparatus suitable for use in an electric vehicle or the like, which has an electric motor that acts as an electric load.

2. Description of the Related Art

Japanese Laid-Open Patent Publication No. 2001-268890 (JP2001-268890A) discloses an electric power conversion system for supplying electric power from a power supply to a load through an electric power conversion device. The electric power conversion device includes input electric power lines, an input common mode return line, output electric power lines, and an output common mode return line, all of which are wound around a magnetic core (also referred to simply as a "core") for reducing common-node noise on the input and output sides of the electric power conversion device.

SUMMARY OF THE INVENTION

Generally, when the core becomes magnetically saturated, common-node noise cannot be removed because the inductance of the core is greatly reduced. It is well known in the art to provide an air gap in the core for preventing the core from becoming magnetically saturated. A core having such an air gap is effective at removing noise from electric power lines.

However, a core having such an air gap causes a problem in that, since flux leakage occurs in the vicinity of the air gap to prevent the core from becoming magnetically saturated, excessive eddy currents are generated in the core near the air gap, which tends to cause localized heating of the core.

One solution would be to provide a plurality of air gaps in the magnetic core for dispersing the occurrence of localized heating. However, plural air gaps in the magnetic core require a complex structure to hold the core securely and to preserve integrity of the core. In addition, there is a certain limitation on efforts to disperse eddy currents, even if the magnetic core has plural gaps therein.

Furthermore, the magnetic core suffers limitations on layout freedom because the magnetic core, which is made of a hard material such as a sintered material, prevents the electric power lines from extending through the magnetic core in regions thereof where the electric power lines are bent.

It is an object of the present invention to provide an electric load control apparatus, which includes a noise removal filter enabling a high degree of layout freedom, and which can have air gaps defined substantially uniformly and easily therein.

According to the present invention, there is provided an electric load control apparatus comprising an electric storage device and an electric power converter connected to the electric storage device through input electric power lines, and connected through output electric power lines to an electric load, the electric power converter having switching elements, which are controlled to energize the electric load with electric power stored in the electric storage device.

The electric load control apparatus also includes a noise removal filter including a bendable sheet made of a magnetic material wound around at least a portion of at least one of the input electric power lines and the output electric power lines, with air gaps disposed between coiled sheet layers of the wound sheet.

Since the noise removal filter includes the bendable sheet, which is flexible, the noise removal filter can be placed on a bent portion of at least one of the input electric power lines and the output electric power lines. Therefore, the noise removal filter enables a large degree of layout freedom, and air gaps are formed easily and substantially uniformly in the sheet because the air gaps can be formed between the sheet layers simply by winding the sheet around at least one of the input electric power lines and the output electric power lines. Constructed in this manner, the noise removal filter is capable of removing common mode noise, i.e., noise generated by switching operations of the switching elements. If the sheet is coiled around the electric power lines over a certain axial distance, then the noise removal filter also is effective at removing radiant noise.

The bendable sheet may be coiled in at least two layers around the electric power line from a starting end thereof. Since the sheet exists between a starting end and a terminal end of the sheet, flux leakage is prevented from being concentrated at a region between the starting end and the terminal end of the sheet. Rather, the flux leakage becomes dispersed, thereby dispersing the heated region.

The bendable sheet may comprise an adhesive layer on one side of the bendable sheet, the air gaps being provided by coiled layers of the adhesive layer of the bendable sheet, which is wound around at least the portion of at least one of the input electric power lines and the output electric power lines. The adhesive layer serves to position and secure the sheet around the electric power lines while also serving as the air gaps.

The bendable sheet may comprise a web-shaped sheet, which is helically coiled in partially overlapping relation to itself around at least the portion of at least one of the input electric power lines and the output electric power lines in an axial direction. If constructed in this manner, the noise removal filter is effective at removing common mode noise generated by switching operations of the electric power converter, and also provides a shielding effect with respect to radiant noise.

The bendable sheet may comprise a web-shaped sheet helically coiled around at least the portion of at least one of the input electric power lines and the output electric power lines in an axial direction, with each coiled layer being axially spaced from adjacent coiled layers to provide an air gap between opposite edges of adjacent coiled layers. If constructed in this manner, the noise removal filter saves material because a smaller amount of the web-shaped sheet is required. In addition, the noise removal filter is effective at removing common mode noise generated by a switching operation of the electric power converter, and also provides a shielding effect with respect to radiant noise.

The bendable sheet may comprise a laminar sheet made up of plural sheets of different magnetic materials corresponding to different frequencies of noise to be removed.

The noise removal filter incorporated in the electric load control apparatus according to the present invention is capable of widening the noise removal frequency range by means of a simple arrangement.

According to the present invention, since the noise removal filter is formed by winding the bendable sheet of magnetic material around the electric power lines, the noise removal filter can easily be placed on bent portions of the electric power lines. Therefore, the noise removal filter enables a large degree of layout freedom, and air gaps of the noise removal filter can be formed easily and substantially uniformly in the sheet, since the air gaps can be formed between the sheet layers simply by winding the sheet around the electric power lines. Constructed in this manner, the noise removal filter is capable of removing common mode noise, and hence is capable of dispersing heat generated by such common node noise.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

An electric load control apparatus according to an embodiment of the present invention will be described below with reference to the drawings.

First, examples of noise removal filters, which are applied to or incorporated in the electric load control apparatus according to the present embodiment, will be described below.

Figure 1:
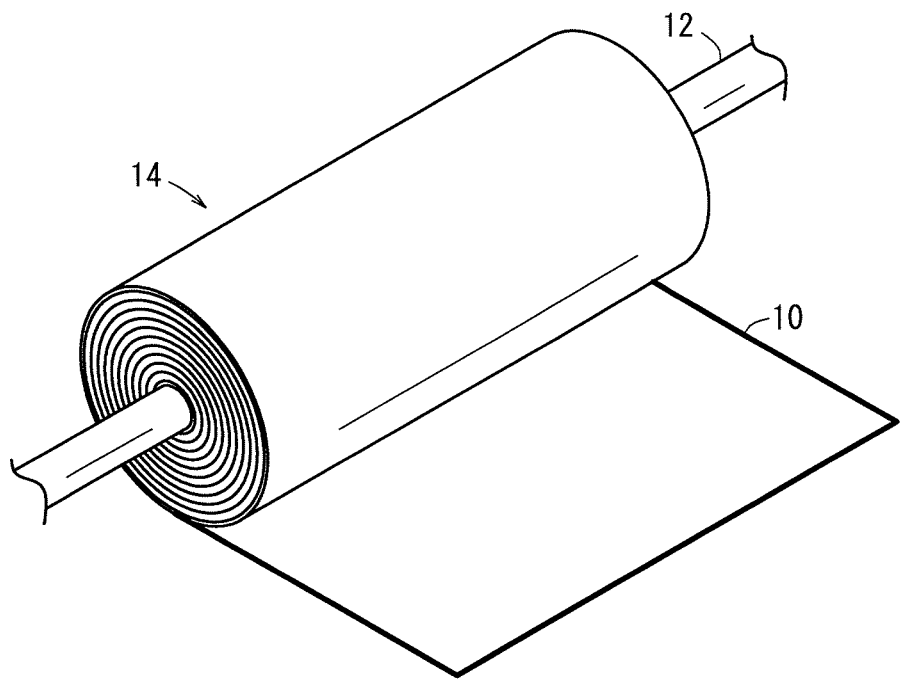
FIG. 1 is a perspective view showing the manner in which a noise removal filter is formed (fabricated)

FIG. 1 shows in perspective the manner in which a noise removal filter 14 is formed or fabricated. The noise removal filter 14 comprises a sheet 10, such as a bendable web-shaped ferrite tape or the like, made of or containing a magnetic material (magnetic body) wound around and fixed to a portion of an electric power line 12 (electric wire) that makes up an electric conductor through which an electric current (not shown) flows.

The electric power line 12 with the sheet 10 wound thereon is not limited to a single electric wire, but may comprise a plurality of electric wires. As described later with reference to FIG. 8, if the electric power line 12 comprises a plurality of single electric power wires, the sheet 10 may be wound around and fixed to the plural electric wires to thereby form the noise removal filter 14.

If the electric power line 12 comprises a single electric wire, such as the electric power line 12 shown in FIG. 1, then the electric power line 12 may be a bare wire or a coated wire. The electric power line 12 is made of a metal material having high electric conductivity, such as copper, aluminum, or the like. The electric power line 12 is not limited to a round wire having a circular cross-sectional shape, but may comprise a bus bar having a rectangular cross-sectional shape, for example.

Figure 2:
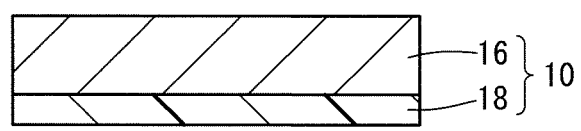
FIG. 2 is a cross-sectional view of a sheet of the noise removal filter.

As shown in FIG. 2, the sheet 10 preferably comprises a double-layer structure having a magnetic layer 16 and an adhesive layer 18 disposed on one side of the magnetic layer 16.

Figure 3:
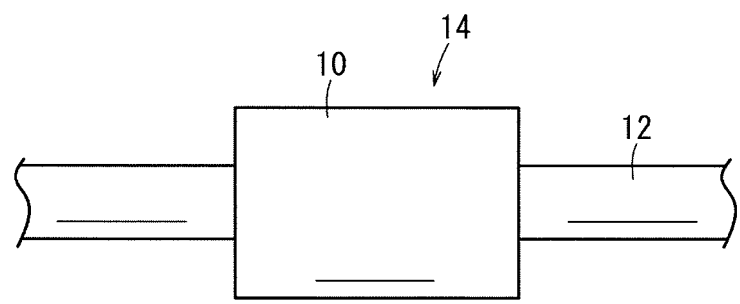
FIG. 3 is a front elevational view of a noise removal filter according to a first example of the present invention.

As shown in FIG. 1, the sheet 10 shown in FIG. 2 is wound around the electric power line 12 in the following manner. First, a starting end of the sheet 10 is placed in close contact with the electric power line 12, and then the sheet 10 begins to be coiled from a starting end thereof in successive layers around the electric power line 12, with the adhesive layer 18 being positioned radially inward from the magnetic layer 16. After a desired length of the sheet 10 has been wound around the electric power line 12, the sheet 10 is cut off, thereby providing a terminal end, which is applied to the sheet coil. FIG. 3 shows in front elevation a noise removal filter 14 according to a first example of the present invention, which is fabricated as described above. The noise removal filter 14 is maintained in a coiled configuration by means of the adhesive layer 18, which is disposed between the coil layers. The adhesive layer 18 may comprise a double-sided adhesive tape.

Figure 4:
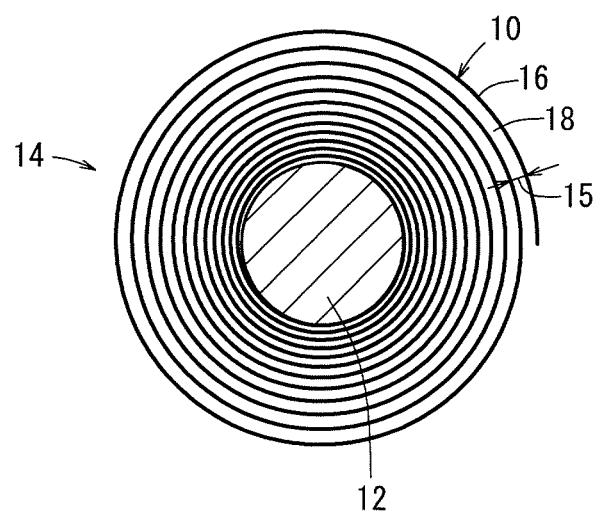
FIG. 4 is a transverse cross-sectional view of the noise removal filter according to the first example.

FIG. 4 is a cross-sectional view of the noise removal filter 14 shown in FIG. 3, taken along a plane perpendicular to the axis of the noise removal filter 14, i.e., the electric power line 12. The sheet 10 is coiled in a spiral pattern around the electric power line 12. Therefore, the magnetic layer 16 is coiled in layers, and the adhesive layer 18 is coiled in layers, each of which is interposed between adjacent layers of the coiled magnetic layer 16. The coiled layers that make up the adhesive layer 18, i.e., interlayer regions between the coiled layers of the magnetic layer 16, serve as air gaps 15, which are spaced at equal intervals radially across the coiled sheet 10, for thereby effectively dispersing flux leakage, as will be described later.

Figure 5:
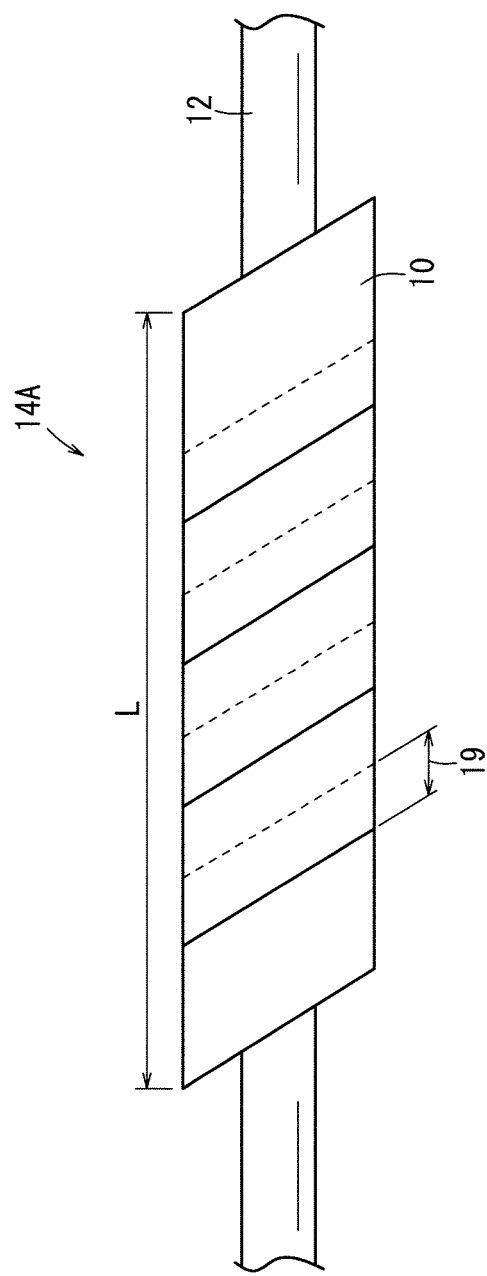
FIG. 5 is a front elevational view of a noise removal filter according to a second example of the present invention.

FIG. 5 is a front elevational view of a noise removal filter 14A according to a second example of the present invention.

As shown in FIG. 5, the noise removal filter 14A includes a web-shaped sheet 10, which is wound helically in partially overlapping relation to itself around the electric power line 12 in an axial direction. More specifically, the sheet 10 is helically coiled around the electric power line 12, with each coil layer having an overlapping portion 19, which overlaps an edge portion of an adjacent coil layer. Although the sheet 10 actually is coiled in intimate contact with the electric power line 12, for facilitating understanding of the invention, the sheet 10 is shown in FIG. 5 as being spaced from the electric power line 12.

Interlayer regions between the coiled layers of the magnetic layer 16 along the overlapping portions 19 serve as air gaps. If the length L of the noise removal filter 14A along the longitudinal direction thereof is selected to be equal to or greater than $\lambda/4$ of a target frequency, i.e., the frequency of the noise to be removed, then the noise removal filter 14A provides a shielding effect with respect to radiant noise.

Figure 6:
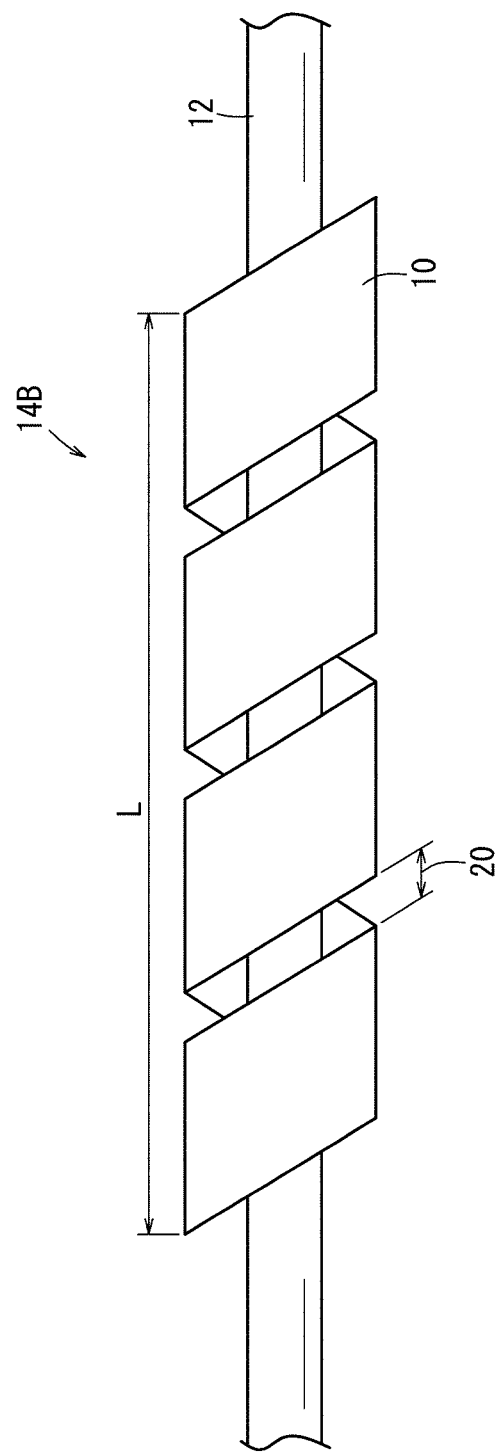
FIG. 6 is a front elevational view of a noise removal filter according to a third example of the present invention.

FIG. 6 is a front elevational view of a noise removal filter 14B according to a third example of the present invention.

As shown in FIG. 6, the noise removal filter 14B includes a web-shaped sheet 10 wound helically around the electric power line 12 in an axial direction. The sheet 10 is coiled helically around the electric power line 12, with each coiled layer being axially spaced from adjacent coiled layers, thereby providing an air gap 20 as a clearance between opposite edges of adjacent coiled layers. In FIG. 6, the sheet 10 also is shown as being spaced from the electric power line 12 for facilitating understanding of the invention, although the sheet 10 actually is coiled in intimate contact with the electric power line 12.

If the length L of the noise removal filter 14B along the longitudinal direction is selected to be equal to or greater than $\lambda/4$ of a target frequency, i.e., the frequency of the noise to be removed, then the noise removal filter 14B provides a shielding effect with respect to radiant noise.

Figure 7:
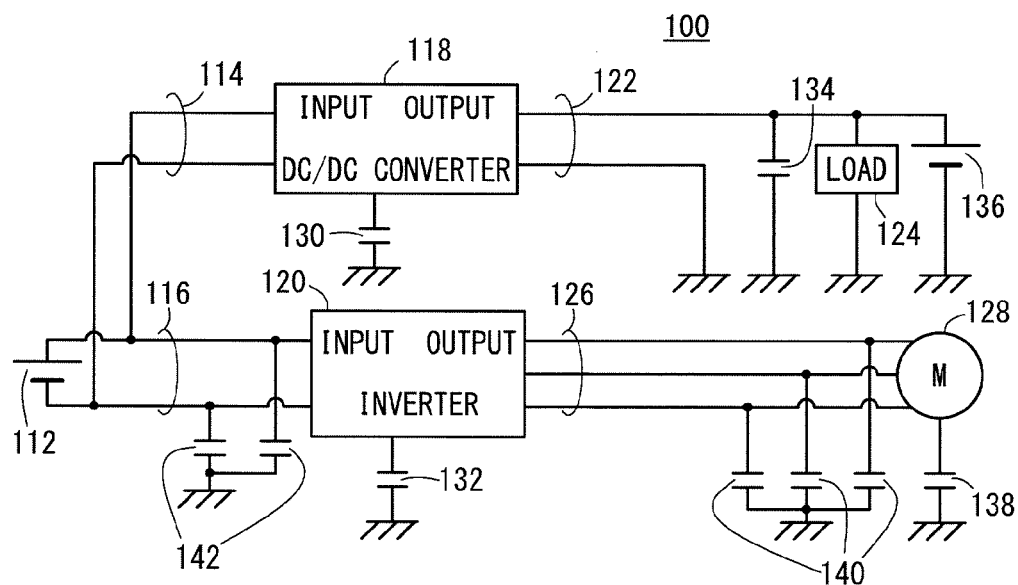
FIG. 7 is a circuit diagram, partially in block form, of an electric motor control apparatus, which is free of noise removal filters.

FIG. 7 is a circuit diagram, partially in block form, of an electric motor control apparatus 100 that serves as an electric load control apparatus, which is free of the noise removal filters 14, 14A, and 14B according to the first through third examples described above.

Figure 8:
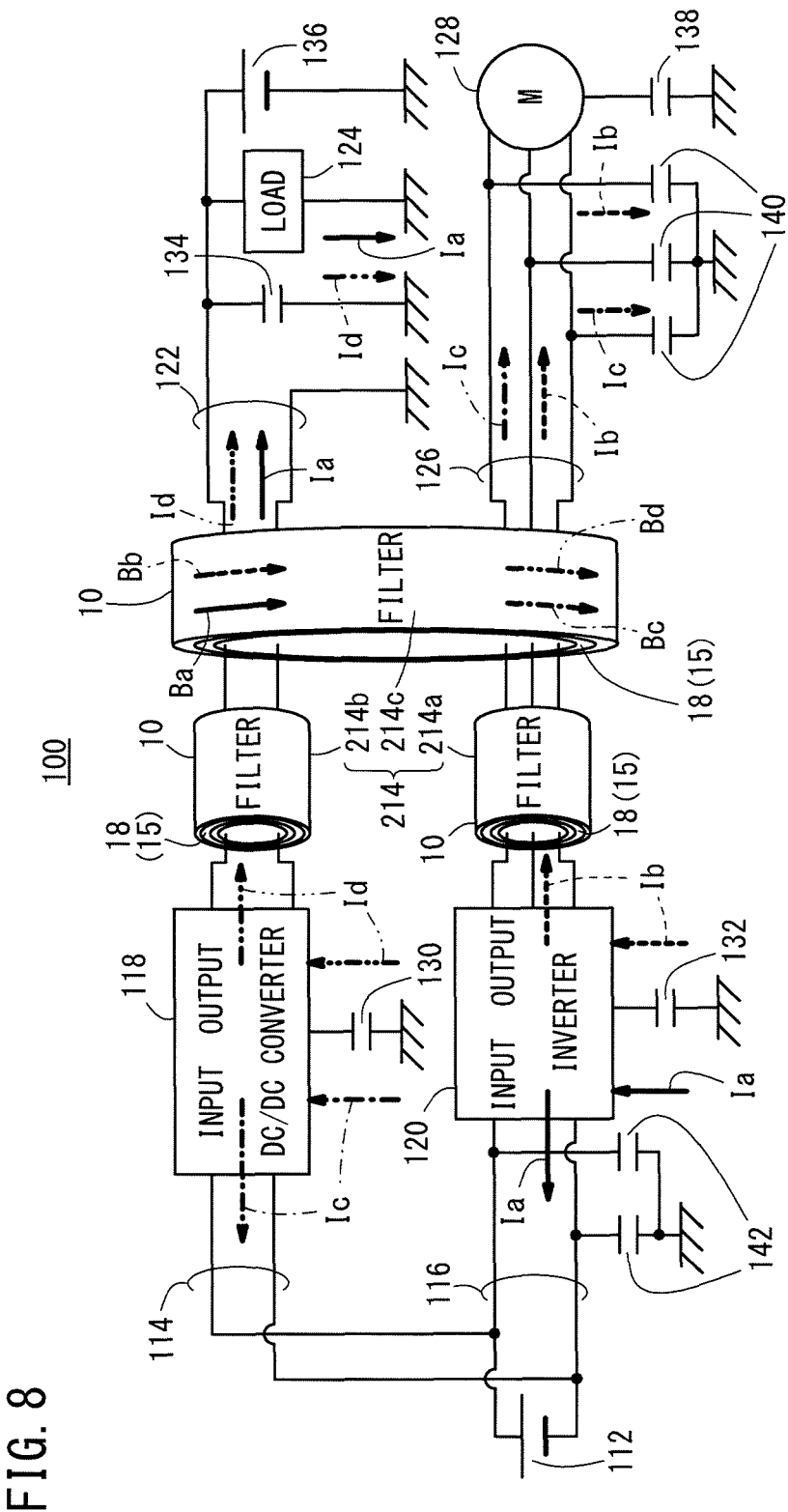
FIG. 8 is a circuit diagram, partially in block form, of an electric motor control apparatus, which serves as an electric load control apparatus according to an embodiment of the present invention.

FIG. 8 is a circuit diagram, partially in block form, of an electric motor control apparatus 100 that serves as an electric load control apparatus according to an embodiment of the present invention, and which incorporates therein any one of the noise removal filters 14, 14A, and 14B according to the first through third examples. The noise removal filter, which is incorporated in the electric motor control apparatus 100, is referred to as a noise removal filter 214. Three noise removal filters 214a, 214b, 214c are shown in FIG. 8, each comprising a sheet 10 wound around and fixed to output electric power lines 122, 126.

As shown in FIG. 8, the electric motor control apparatus 100 incorporates the three noise removal filters 214a, 214b, and 214c therein.

As shown in FIG. 7, the electric motor control apparatus 100 basically includes a high-voltage electric storage device 112 such as a lithium ion secondary cell, a capacitor, or the like, which serves as an energy storage device, a DC/DC converter 118 (electric power conversion device), and an inverter 120 (electric power conversion device), which have input terminals connected to the high-voltage electric storage device 112 through input electric power lines 114, 116, a load (accessory or auxiliary load) 124 that acts as an electric load connected to the DC/DC converter 118 through output electric power lines 122, and a three-phase electric motor (motor) 128 as a main load, which is an electric load connected to the inverter 120 through three-phase output electric power lines 126.

The electric motor 128 has an output shaft coupled to non-illustrated drive road wheels through a transmission (not shown).

The DC/DC converter 118 and the inverter 120 are connected to ground by respective stray capacitors 130, 132.

The DC/DC converter 118 comprises a chopper-type down converter having switching elements, which operate by switching to convert DC electric power from the high-voltage electric storage device 112 into low-voltage DC electric power. Such low-voltage DC electric power is supplied to the load 124, and also is supplied to a low-voltage electric storage device 136 in order to charge the same.

The inverter 120 comprises, for example, a three-phase full bridge switching element, which operates by switching to convert DC electric power from the high-voltage electric storage device 112 into three-phase AC electric power. The three-phase AC electric power is supplied in order to energize the electric motor 128.

The load 124, which is supplied with electric power from the DC/DC converter 118, is connected in parallel with a smoothing capacitor 134 and the low-voltage electric storage device 136. The low-voltage electric storage device 136 serves as an energy storage device in the form of a secondary battery such as a lead battery or the like.

A stray capacitor 138 is connected between the electric motor 128 and ground. Stray capacitors 140 also are connected between the output electric power lines 126 of the inverter 120 and ground.

In addition, stray capacitors 142 are connected between the input electric power lines 116 of the inverter 120 and ground.

As shown in FIG. 8, the noise removal filter 214a is constructed by winding the sheet 10 (see FIGS. 1 and 2) around the three-phase output electric power lines 126 of the inverter 120. The noise removal filter 214b is constructed by winding the sheet 10 around the output electric power lines 122 (a voltage line and a ground line) of the DC/DC converter 118.

The noise removal filter 214c is constructed by winding the sheet 10 around both the output electric power lines 122 of the DC/DC converter 118 and the output electric power lines 126 of the inverter 120, such that the output electric power lines 122, 126 pass through the noise removal filter 214c.

Any one of the noise removal filters 214a, 214b, 214c is effective at removing common mode noise. The noise removal filters 214a, 214b, 214c may be wound around the input electric power lines 114, 116 of the DC/DC converter 118 and the inverter 120.

Reduction or removal of common mode noise will be described below. Common mode noise, which occurs at a certain time due to switching operations of the switching elements of the inverter 120, for example, is produced simultaneously, i.e., synchronously, at input and output sides of the inverter 120 as a common-mode current Ia (indicated by the solid line) and a common-mode current Ib (indicated by the broken line), which travel through the input and output electric power lines 116, 126.

The common-mode current Ia, which travels to the input side of the inverter 120, flows to ground through the input electric power lines 116, 114, the DC/DC converter 118, the noise removal filters 214b, 214c, the output electric power lines 122, the smoothing capacitor 134, the load 124, and the low-voltage electric storage device 136. From ground, the common-mode current Ia flows through the stray capacitor 132 back to the inverter 120.

The common-mode current Ib, which travels to the output side of the inverter 120, flows to ground through the noise removal filters 214a, 214c, the output electric power lines 126, and the stray capacitors 140, 138. From ground, the common-mode current Ib flows through the stray capacitor 132 back to the inverter 120.

Macroscopically, the common-mode current Ia and the common-mode current Ib flow simultaneously, i.e., synchronously, and pass through the noise removal filter 214c. When the common-mode current Ia and the common-mode current Ib pass through the noise removal filter 214c, a magnetic flux Ba and a magnetic flux Bb are generated, respectively, in a circumferential direction of the noise removal filter 214c. Since the magnetic flux Ba and the magnetic flux Bb are oriented in the same direction, the magnetic fluxes Ba and Bb are highly effective at eliminating or reducing common mode noise.

A common-mode current Ic, which is produced by the DC/DC converter 118 and travels to the input side, and a common-mode current Id, which is produced by the DC/DC converter 118 and travels to the output side, both generate a magnetic flux Bc and a magnetic flux Bd in a similar manner, respectively, in the circumferential direction of the noise removal filter 214c.

If the DC/DC converter 118 and the inverter 120 are switched by a common clock signal or by respective clock signals the frequencies of which are related to each other such that one of the frequencies is generated by dividing the other, then the generated magnetic fluxes Ba, Bb, Bc, Bd are oriented in the same direction at times that the DC/DC converter 118 and the inverter 120 are switched in synchronism with each other. Such generated magnetic fluxes Ba, Bb, Bc, Bd, which are oriented in the same direction, are particularly and highly effective at reducing or removing common mode noise.

[Principles of Noise Reduction]

The principles of reducing or removing noise will be described below. Noise is reduced by loss of iron in the magnetic material (magnetic body). Such iron loss comprises both a hysteresis loss and an eddy current loss.

Hysteresis loss is caused in the following manner. When an alternating magnetic field flows through the magnetic body, the magnetic body becomes magnetized in a direction in which the magnetic field changes. Therefore, atomic or molecular internal friction in the magnetic body causes an energy loss, which is dissipated as heat.

Figure 9:
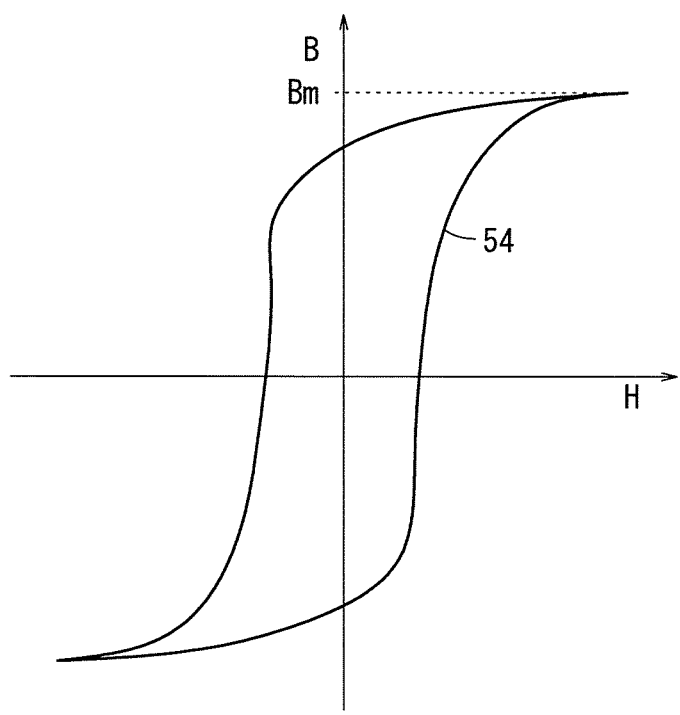
FIG. 9 is a diagram showing a B-H curve.

As indicated by the B-H curve shown in FIG. 9, hysteresis loss is a loss that is represented by the area of a hysteresis loop 54 per period, which is plotted on a coordinate system made up of intensity H and flux density B of an alternating magnetic field, which is applied to the magnetic body. The hysteresis loop Ph is expressed by Steinmetz's equation (1), as shown below.

$$Ph = kh \cdot f \cdot Bm^{1.6} \quad (1)$$

where kh represents a hysteresis constant, f represents the frequency [Hz] of the alternating magnetic field, and Bm represents the maximum flux density [T].

Figure 10:
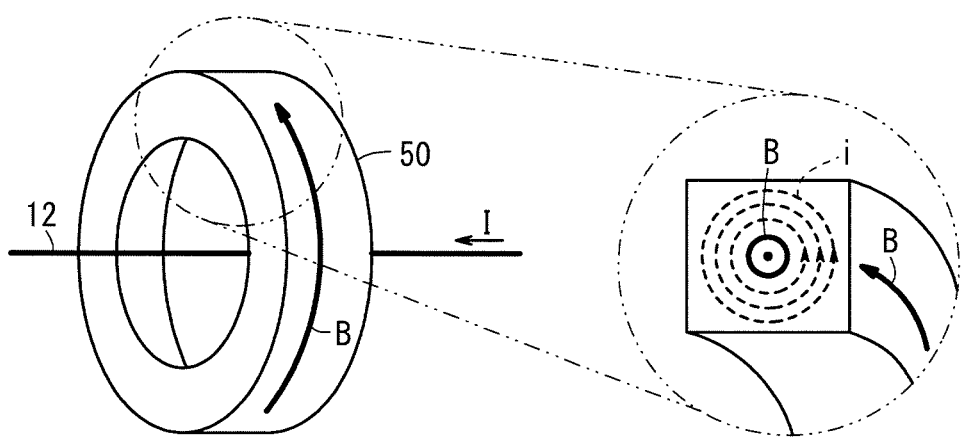
FIG. 10 is a schematic diagram illustrative of eddy current loss.

Eddy current loss is caused in the following manner. As shown in FIG. 10, when a magnetic flux B, which varies with time, is produced in a magnetic body such as an annular filter 50, an eddy current i flows in the magnetic body about the magnetic flux B. Due to flowing of the eddy current i, Joule heat is produced as an eddy current loss Pe, on account of electric resistance in the magnetic body.

When a noise current I flows through the electric power line 12, as shown in FIG. 10, a magnetic flux B depending on the noise current I is generated according to Fleming's right hand rule. Upon the magnetic flux B passing through the magnetic body, an eddy current i, which depends on the magnetic flux B, flows about the magnetic flux B in the right hand direction.

The eddy current loss Pe is expressed by the following equation (2):

$$Pe = ke \cdot Bm^2 \cdot f^2 \quad (2)$$

where ke represents an eddy current loss coefficient, Bm represents the maximum flux density [T], and f represents frequency [Hz].

In this manner, the magnetic body is capable of reducing noise based on an iron loss Ploss, which is made up of a combination of hysteresis loss and eddy current loss, as expressed by the following equation (3):

$$\begin{aligned} Ploss &= Ph + Pe \\ &= kh \cdot f \cdot Bm^{1.6} + ke \cdot Bm^2 \cdot f^2 \end{aligned} \quad (3)$$

Therefore, noise is converted into heat and noise is reduced when the magnetic flux B produced by the noise current I flows through the magnetic body.

When the magnetic body becomes magnetically saturated, since the inductance thereof is greatly reduced, the noise removal capability of the magnetic body is lost.

Figure 11A:
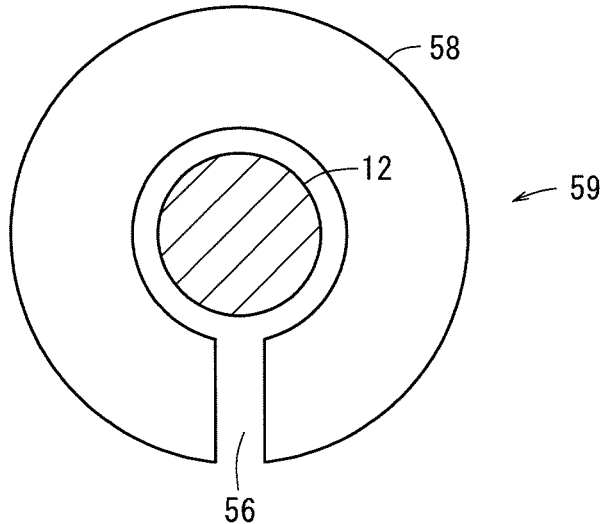
FIG. 11A is a transverse cross-sectional view of a noise removal filter having an air gap therein according to a comparative example.
Figure 11B:
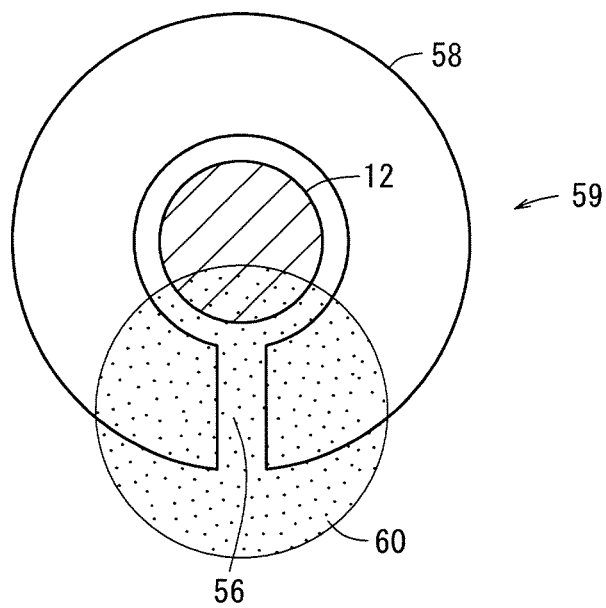
FIG. 11B is a transverse cross-sectional view showing how a flux leakage is concentrated in the noise removal filter according to the comparative example.

FIG. 11A shows in transverse cross section a noise removal filter 59 according to a comparative example. As shown in FIG. 11A, the noise removal filter 59 comprises a magnetic core 58 having an air gap 56. As shown in FIG. 11B, the air gap 56 produces a flux leakage 60, which prevents the magnetic core 58 from becoming magnetically saturated. However, as shown in FIG. 11B, if the flux leakage 60 is concentrated in a certain region, heating also becomes concentrated in that region, thereby causing the inductance of the magnetic core 58 to be greatly reduced.

Figure 12A:
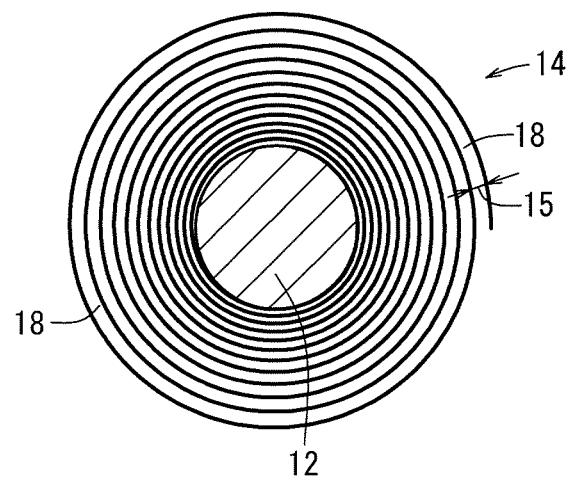
FIG. 12A is a transverse cross-sectional view of a noise removal filter, which is incorporated in the electric motor control apparatus that serves as the electric load control apparatus according to the present embodiment.

FIG. 12A shows in transverse cross section the noise removal filter 14 (see also FIGS. 1 and 2) according to the present embodiment. The noise removal filter 14 has the air gaps 15, which are formed by the coiled layers of the adhesive layer 18, i.e., by interlayer regions between the coiled layers of the magnetic layer 16. Since the air gaps 15 are distributed across the coiled sheet 10, the air gaps 15 prevent flux leakage 62 from becoming concentrated in a certain region. Stated otherwise, as shown in FIG. 12B, the air gaps 15 disperse the flux leakage 62 and make the flux leakage 62 uniform throughout the coiled sheet 10.

Figure 12B:
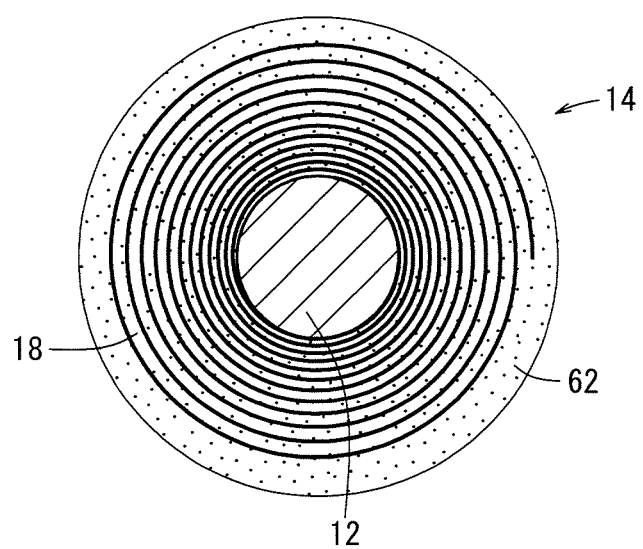
FIG. 12B is a transverse cross-sectional view showing the manner in which flux leakage is dispersed in the noise removal filter shown in FIG. 12A.
Figure 13:
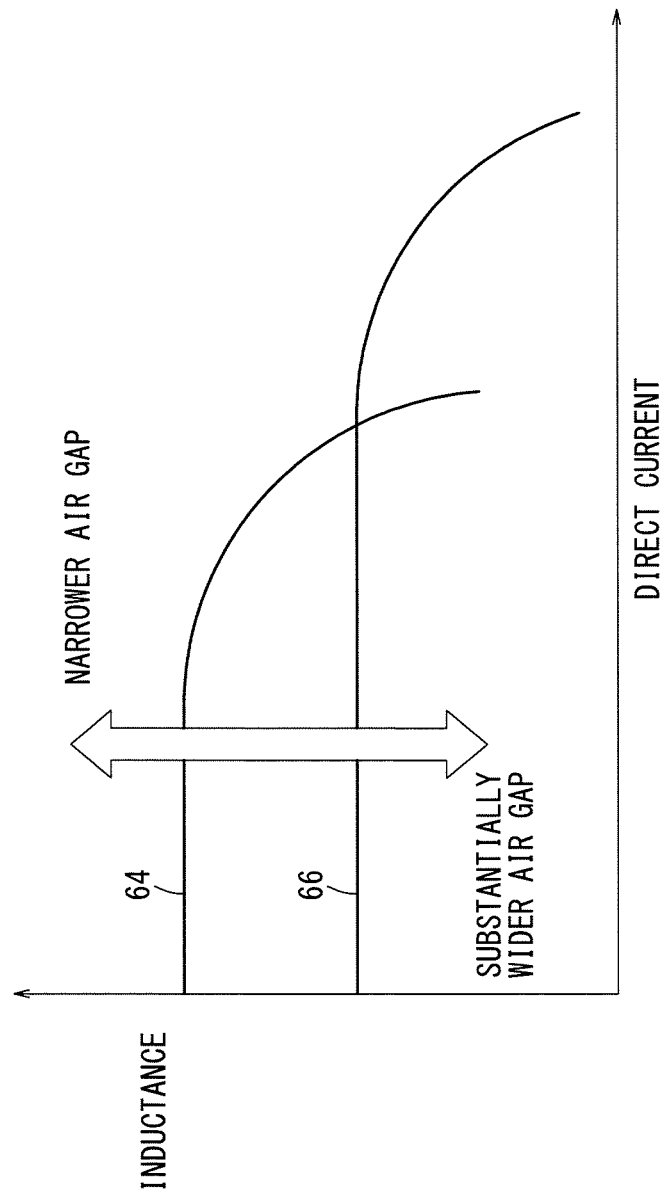
FIG. 13 is a diagram showing a relationship between inductance and a superposed direct current, and showing different characteristic curves for narrow and wide air gaps.

The noise removal filter 14 shown in FIGS. 12A and 12B, which has a substantially wider air gap, is applicable to the electric motor control apparatus 100 that serves as an electric load control apparatus according to the present embodiment. As shown in FIG. 13, the noise removal filter 14 shown in FIGS. 12A and 12B has a wider inductance vs. superposed direct current characteristic curve 66 than the inductance vs. superposed direct current characteristic curve 64 of the noise removal filter 59 according to the comparative example shown in FIGS. 11A and 11B.

Figure 14A:
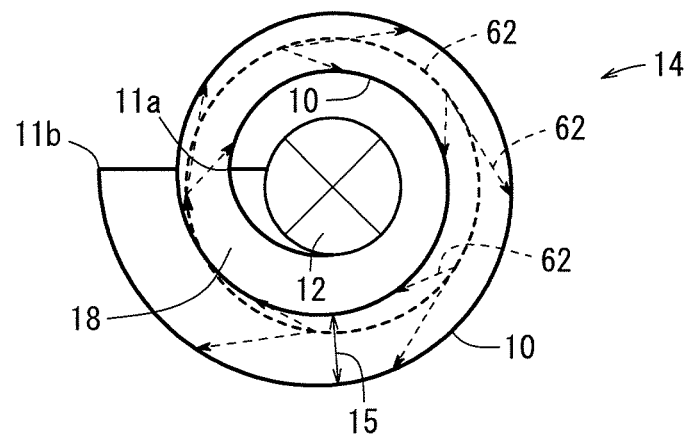
FIG. 14A is a transverse cross-sectional view illustrative of flux leakage in the noise removal filter, which is incorporated in the electric motor control apparatus that serves as the electric load control apparatus according to the present embodiment.
Figure 14B:
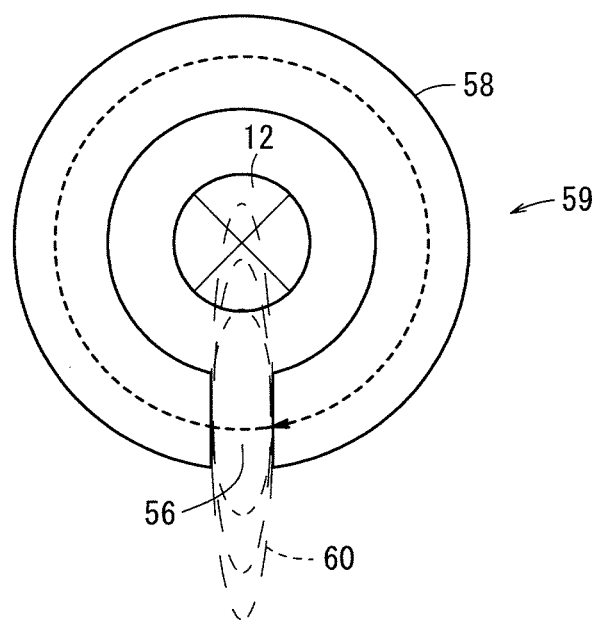
FIG. 14B is a transverse cross-sectional view illustrative of flux leakage in the noise removal filter according to the comparative example.

The behavior of the noise removal filter 14 and that of the noise removal filter 59 will be described below in a more visually perceptible manner with reference to FIGS. 14A and 14B. As shown in FIG. 14B, the noise removal filter 59 according to the comparative example produces a flux leakage 60, which is concentrated in the air gap 56 and thus produces a concentrated heated region. On the other hand, as shown in FIG. 14A, the noise removal filter 14 disperses the flux leakage 60 and makes the flux leakage 60 uniform. Thus, the heated region becomes dispersed and uniform as a result of the air gaps 15, which extend spirally within the coiled sheet 10 around the electric power line 12.

Figure 15:
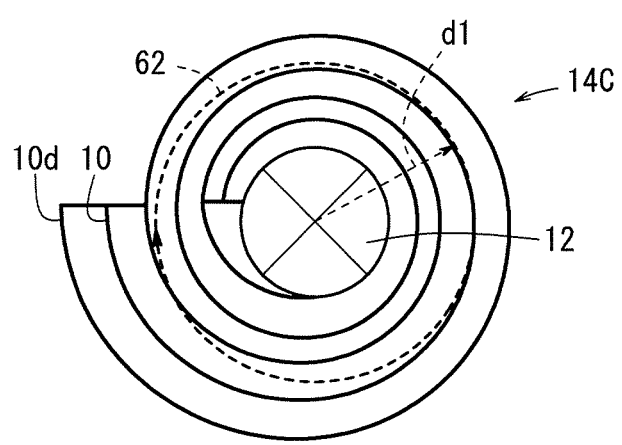
FIG. 15 is a transverse cross-sectional view of a noise removal filter according to a fourth example of the present invention, which comprises a laminar sheet made up of two sheets of different magnetic materials (magnetic bodies), which are wound as a plurality of layers around an electric power line.

FIG. 15 shows in transverse cross section a noise removal filter 14C according to a fourth example of the present invention. The noise removal filter 14C comprises a laminar sheet made up of two sheets 10, 10d of different magnetic materials (magnetic bodies), corresponding to different frequencies of noise to be removed. The two sheets 10, 10d are wound as a plurality of layers around an electric power line 12. The sheets 10, 10d can be considered to be radially spaced by the same distance d1 from the electric power line 12.

Figure 16:
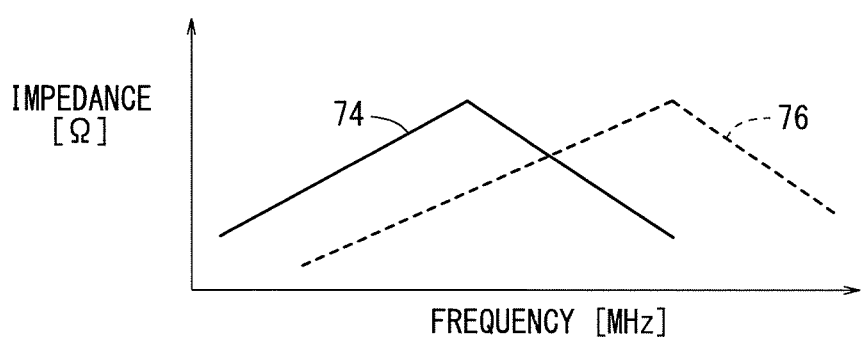
FIG. 16 is a diagram showing impedance vs. frequency characteristics, which illustrate advantages of the noise removal filter according to the fourth example.

As shown in FIG. 16, if the sheet 10 has an impedance vs. frequency characteristic curve 74, whereas the sheet 10d has an impedance vs. frequency characteristic curve 76, for example, then the noise removal filter 14C exhibits high impedance within a wide frequency range, and thus is effective at removing common mode noise within such a wide frequency range.

Therefore, the noise removal filter 14C enables magnetic materials having different frequency characteristics to be disposed uniformly in a space-saving layout.

Figure 17:
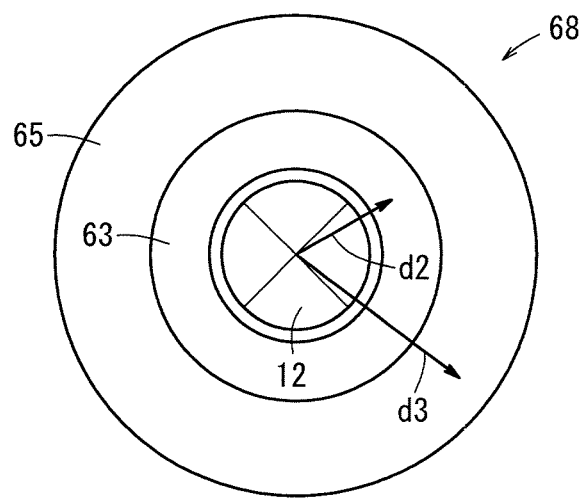
FIG. 17 is a transverse cross-sectional view of a noise removal filter according to another comparative example.

FIG. 17 shows in transverse cross section a noise removal filter 68 according to a comparative example. As shown in FIG. 17, the noise removal filter 68 includes a magnetic core made of different magnetic materials 63, 65, which are disposed concentrically around an electric power line 12. The magnetic materials 63, 65 are spaced radially from the electric power line 12 by different distances d2, d3, which cannot be physically equal to each other.

Figure 18:
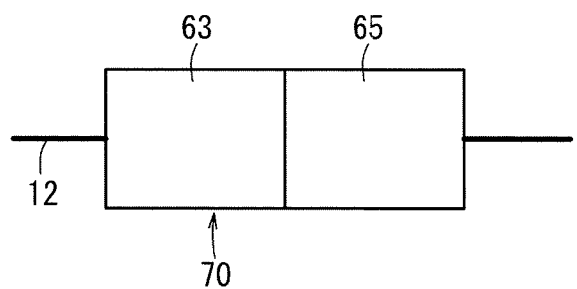
FIG. 18 is a front elevational view of a noise removal filter according to yet another comparative example, in which different magnetic materials are spaced physically by equal distances from an electric power line.

FIG. 18 shows in front elevation a noise removal filter 70 according to another comparative example. As shown in FIG. 18, the noise removal filter 70 comprises a magnetic core made of different magnetic materials 63, 65, which are spaced radially from each other at physically equal distances from an electric power line 12. The magnetic materials 63, 65 are placed end to end on the electric power line 12. Although the magnetic materials 63, 65 are spaced equally from the electric power line 12, the noise removal filter 70 is comparatively long along the axial direction of the electric power line 12, and thus the noise removal filter 70 has poor space efficiency.

Stated otherwise, the dual-sheet noise removal filter 14C according to the fourth example shown in FIG. 15 enables the electric power line 12 to be axially shorter than the electric power line 12 of the noise removal filter 70 according to the comparative example shown in FIG. 18.

According to the present embodiment, as described above, the electric motor control apparatus 100, which serves as an electric load control apparatus shown in FIG. 8, includes the high-voltage electric storage device 112 as an energy storage device, which is connected through the input electric power lines 116 to input terminals of the inverter 120, which functions as an electric power converter. In addition, the inverter 120 includes output terminals connected through the output electric power lines 126 to the electric motor 128 that acts as an electric load. Switching elements of the inverter 120 are controlled in order to energize the electric motor 128 with electric power from the high-voltage electric storage device 112.

The noise removal filter 214a, which includes the bendable sheet 10 made of a magnetic material wound around the output electric power lines 126 with air gaps 15 existing between the coiled sheet layers, is disposed on at least a portion of the input electric power lines 116 and/or the output electric power lines 126 (at least one of the input electric power lines 116 and the output electric power lines 126).

Since the noise removal filter 214a includes the bendable sheet 10, which is flexible, the noise removal filter 214a can be placed on a bent portion of the input electric power lines 116 and/or the output electric power lines 126. Therefore, a large degree of layout freedom is available for the noise removal filter 214a, and the air gaps 15 thereof can be formed easily and substantially uniformly in the sheet 10, since the air gaps 15 can be formed between the sheet layers simply by winding the sheet 10 around the input electric power lines 116 and/or the output electric power lines 126.

The noise removal filter 214a constructed in the foregoing manner is capable of removing common mode noise, and also is capable of removing radiant noise assuming that the length of the noise removal filter 214a along the axial direction is selected to be equal to or greater than $\lambda/4$ of the frequency of the noise to be removed.

According to the present embodiment, air gaps 15 are provided by the coiled layers of the adhesive layer 18. However, even in the absence of the adhesive layer 18, the web-shaped magnetic layer 16 of the sheet 10, which is wound around the electric power line 12 in intimate contact therewith, still is effective at removing noise, since microscopic physical air gaps necessarily are present between the wound layers of the sheet 10.

As shown in FIG. 14A, for example, the sheet 10 of the noise removal filter 14 is coiled in at least two layers or turns around the electric power line 12 from a starting end 11a to a terminal end 11b of the sheet 10. Thus, the magnetic sheet, i.e., the sheet 10, exists between the starting end 11a and the terminal end 11b of the sheet 10. Therefore, flux leakage 60, which otherwise would tend to be concentrated in the air gap 56 in the comparative example shown in FIG. 14B (which corresponds to the air gap between the starting end 11a and the terminal end 11b in the noise removal filter 14 shown in FIG. 14A), becomes dispersed in the same manner as the flux leakage 62 shown in FIG. 14A, thereby dispersing the heated region.

As shown in FIGS. 2 and 4, the sheet 10 of the noise removal filter 14 includes the adhesive layer 18 on one side of the magnetic layer 16. When the sheet 10 is coiled around the electric power line 12, coiled layers of the adhesive layer 18 serve as air gaps 15 formed between the coiled layers of the magnetic layer 16. The adhesive layer 18 serves to position and secure the sheet 10 around the electric power line 12, and also serves to create the air gaps 15. The air gaps 15, which are formed in this manner, are spaced at uniform distances around the electric power line 12.

In the second example shown in FIG. 5, the web-shaped sheet 10 of the noise removal filter 14A is coiled in a helical pattern around the electric power line 12, with each of the coiled layers having an overlapping portion, which overlaps an edge portion of an adjacent coiled layer. The noise removal filter 14A is effective at removing common mode noise generated by switching operations of the DC/DC converter 118 and the inverter 120, and also provides a shielding effect with respect to radiant noise.

In the third example shown in FIG. 6, the web-shaped sheet 10 of the noise removal filter 14B is helically coiled around the electric power line 12 in an axial direction, with each of the coiled layers being axially spaced from adjacent coiled layers in order to provide an air gap 20 as a clearance between opposite edges of adjacent coiled layers. The noise removal filter 14B saves material because the noise removal filter 14B requires a smaller amount of material for the sheet 10 than the noise removal filter 14A shown in FIG. 5. In addition, the noise removal filter 14B is effective at removing common mode noise, which is generated by switching operations of the DC/DC converter 118 and the inverter 120, in addition to providing a shielding effect with respect to radiant noise.

As shown in FIG. 15, the sheet 10 of the noise removal filter 14C comprises a laminar sheet made up of two sheets 10, 10*d* of different magnetic materials corresponding to different frequencies of noise to be removed. The noise removal filter 14C is capable of widening the noise removal frequency range by means of a simple arrangement.

Although certain preferred embodiments of the present invention have been shown and described in detail, it should be understood that various changes and modifications may be made to the embodiments without departing from the scope of the invention as set forth in the appended claims.

What is claimed is:

1. An electric load control apparatus comprising:
   an electric storage device;
   an electric power converter connected to the electric storage device through input electric power lines, and connected through output electric power lines to an electric load, the electric power converter having switching elements, which are controlled to energize the electric load with electric power stored in the electric storage device; and
   a noise removal filter including a bendable sheet made of a magnetic material wound around at least a portion of at least one of the input electric power lines and the output electric power lines, with air gaps disposed between coiled sheet layers of the wound sheet,
   wherein the bendable sheet comprises a laminar sheet made up of plural sheets of different magnetic materials corresponding to different frequencies of noise to be removed.

2. The electric load control apparatus according to claim 1, wherein the bendable sheet is coiled in at least two layers around the electric power line from a starting end thereof.

3. The electric load control apparatus according to claim 1, wherein the bendable sheet comprises an adhesive layer on one side of the bendable sheet, the air gaps being provided by coiled layers of the adhesive layer of the bendable sheet, which is wound around at least the portion of at least one of the input electric power lines and the output electric power lines.

4. The electric load control apparatus according to claim 3, wherein the bendable sheet comprises a band-shaped sheet, which is helically coiled in partially overlapping relation to itself around at least the portion of at least one of the input electric power lines and the output electric power lines in an axial direction.

5. The electric load control apparatus according to claim 3, wherein the bendable sheet comprises a band-shaped sheet helically coiled around at least the portion of at least one of the input electric power lines and the output electric power lines in an axial direction, with each coiled layer being axially spaced from adjacent coiled layers to provide an air gap between opposite edges of adjacent coiled layers.

* * * * *